United States Patent [19]

Hokari

[11] Patent Number: 5,987,025
[45] Date of Patent: Nov. 16, 1999

[54] ATM RELAY SYSTEM CAPABLE OF CARRYING OUT RELAY CONNECTION ON ATM CELLS AS IT IS

[75] Inventor: Makoto Hokari, Tokyo, Japan

[73] Assignee: NEC Corporation, Tokyo, Japan

[21] Appl. No.: 08/822,749

[22] Filed: Mar. 24, 1997

[30] Foreign Application Priority Data

Mar. 22, 1996 [JP] Japan .................................... 8-093309

[51] Int. Cl.[6] .............................. H04J 3/04; H04L 12/56
[52] U.S. Cl. ........................ 370/352; 370/535; 370/395; 370/474
[58] Field of Search ..................................... 370/535, 537, 370/538, 540, 542, 543, 544, 352, 354, 355, 356, 395, 466, 474

[56] References Cited

U.S. PATENT DOCUMENTS

| | | | |
|---|---|---|---|
| 5,228,031 | 7/1993 | Mertelmeier et al. | 370/422 |
| 5,241,534 | 8/1993 | Omuro et al. | 370/218 |
| 5,502,723 | 3/1996 | Sanders | 370/352 |
| 5,737,338 | 4/1998 | Eguchi et al. | 370/249 |
| 5,784,371 | 7/1998 | Iwai | 370/397 |

FOREIGN PATENT DOCUMENTS 4-100452  4/1992  Japan .

OTHER PUBLICATIONS

Masaharu Morikawa et al., *NEC Technical Report*, vol. 48, No. 4, 1995, pp. 46–51.

*Primary Examiner*—Hassan Kizou
*Assistant Examiner*—Saba Tsegaye
*Attorney, Agent, or Firm*—Sughrue, Mion, Zinn, MacPeak & Seas, PLLC

[57] ABSTRACT

In an ATM relay system comprising an ATM network (30) and a plurality of private branch exchange systems each of which comprises a switching system (11, 12, 13) and an ATM multiplexing unit (21, 22, 23) connected to the ATM network (30), the switching system (12) comprises a central control unit 46 for delivering an interchange indication signal to said ATM multiplexing unit (22) on carrying out a relay connection from the ATM network (30) to the ATM network (30). Responsive to the interchange indication signal, the ATM multiplexing unit (22) carries out an interchange operation.

8 Claims, 5 Drawing Sheets

ATM RELAY SYSTEM CAPABLE OF CARRYING OUT RELAY CONNECTION ON ATM CELLS AS IT IS

BACKGROUND OF THE INVENTION

This invention relates to an asynchronous transfer mode (ATM) relay system and, more particularly, to a private branch exchange system or a switching system connected to an ATM network.

An ATM relay system of the type described is disclosed in a report which is contributed by Masaharu Morikawa et al. to NEC technical report, Vol. 48, No. 4 (1995), pages 46–51, and which has a title of "ATM Multiplex System MM-Node 9510". According to this report, the ATM relay system comprises an ATM network and a plurality of private branch exchange systems. Each private branch exchange system comprises a switching system and an ATM multiplexing unit connected to the ATM network. The switching system is connected to the ATM multiplexing unit via a standard private line interface. It will be assumed that relay connection is made from the ATM network to the ATM network. In this event, the relay connection is carried out via a synchronous transfer mode (STM) link in the switching system. Under the circumstances, the ATM multiplexing unit must carry out cell assembly and disassembly therein. In other words, the ATM multiplexing unit must carry out ATM/STM conversion.

However, the conventional ATM relay system has troubles as follows. The cell assembly and disassembly must be carried out for the ATM/STM conversion in the conventional ATM relay system comprising a plurality of switching systems whenever the relay connection is carried out via the plurality of switching systems. As a result, delay of the cell assembly occurs. The delay of the cell assembly has adverse effect in speech communication owing to generation of echoes or the like. In addition, there is a case where a high efficient encoding such speech compression, silent compression or the like is carried out in the conventional ATM relay system. When multistage ATM/STM conversions are carried out for the relay connection with such a high efficient encoding carried out, degradation of speech quality becomes violent in the speech communication. For example, a trouble of no communication arises in facsimile communication or the like.

SUMMARY OF THE INVENTION

It is therefore an object of this invention to provide an ATM relay system, which is capable of carrying out relay connection on ATM cells as it is.

It is another object of this invention to provide an ATM relay system of the type described, which is capable of prevent degradation of speech quality in speech communication.

Other objects of this invention will become clear as the description proceeds.

According to a first aspect of this invention, a private branch exchange system comprises a switching system and an ATM multiplexing unit connected to an ATM network. The switching system includes a time-division switch. The ATM multiplexing unit is connected to the switching system via a truck interface. The switching system comprises means for delivering an interchange indication signal to the ATM multiplexing unit on carrying out a relay connection from the ATM network to the ATM network. Responsive to the interchange indication signal, the ATM multiplexing unit carries out an interchange operation.

According to a second aspect of this invention, a switching system comprises a time-division switch and an ATM multiplexing unit connected to an ATM network. The ATM multiplexing unit is connected to the time-division switch. The switching system comprises means for delivering an interchange indication signal to the ATM multiplexing unit on carrying out a relay connection from the ATM network to the ATM network. Responsive to the interchange indication signal, the ATM multiplexing unit carries out an interchange operation.

According to a third aspect of this invention, an ATM relay system comprises an ATM network and a plurality of private branch exchange systems each of which comprises a switching system and an ATM multiplexing unit connected to the ATM network. The switching system includes a time-division switch. The ATM multiplexing unit is connected to the switching system via a truck interface. The switching system comprises means for delivering an interchange indication signal to the ATM multiplexing unit on carrying out a relay connection from the ATM network to the ATM network. Responsive to the interchange indication signal, the ATM multiplexing unit carries out an interchange operation.

According to a fourth aspect of this invention, an ATM relay system comprises an ATM network and a plurality of switching systems each of which comprises a time-division switch and an ATM multiplexing unit connected to the ATM network. The ATM multiplexing unit is connected to the time-division switch. The switching system comprises means for delivering an interchange indication signal to the ATM multiplexing unit on carrying out a relay connection from the ATM network to the ATM network. Responsive to the interchange indication signal, the ATM multiplexing unit carries out an interchange operation.

In each of the above-mentioned first through fourth aspects of this invention, the time-division switch carries out time-division switching operation on an input STM signal to produce an output STM signal. The ATM multiplexing unit comprises cell assembly and disassembly means connected to the time-division switch via the truck interface. The cell assembly and disassembly means assembles the output STM signal into a plurality of output ATM packets each having a fixed length and disassembles a plurality of input ATM packets into the input STM signal. Connected to the cell assembly and disassembly means and the ATM network, multiplexing/demultiplexing means multiplexes the output ATM packets into an output multiplexed ATM signal and demultiplexes an input multiplexed ATM signal from the ATM network into the input ATM packets. The ATM multiplexing unit comprises means, responsive to the interchange indication signal, for making the multiplexing/demultiplexing means interchange the input multiplexed ATM signal into the output ATM multiplexed signal.

DESCRIPTION OF THE PREFERRED EMBODIMENTS

Figure 1:
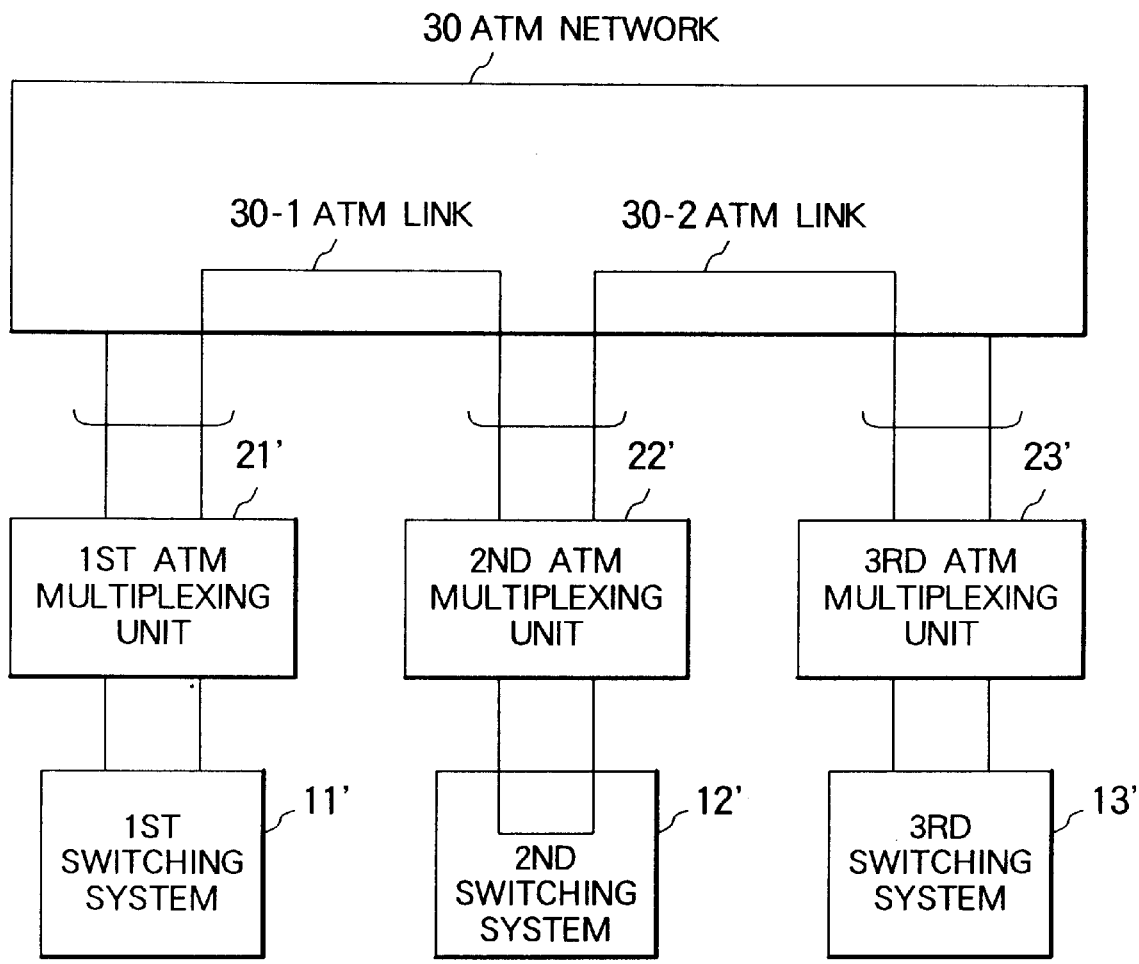
FIG. 1 is a block diagram of a conventional ATM relay system.

Referring to FIG. 1, a conventional ATM relay system will be described in order to facilitate an understanding of the present invention. The illustrated ATM relay system comprises first through third switching systems 11', 12', and 13', first through third ATM multiplexing units 21', 22', and 23', and an ATM network 30. The first through the third switching systems 11' to 13' are connected to the ATM network 30 via the first through the third ATM multiplexing units 21' to 23', respectively.

A combination of the first switching system 11' and the first ATM multiplexing unit 21' is called a first private branch exchange system. A combination of the second switching system 12' and the second ATM multiplexing unit 22' is called a second private branch exchange system. A combination of the third switching system 13' and the third ATM multiplexing unit 23' is called a third private branch exchange system.

The description will be made as regards operation in a case where the first switching system 11 is connected to the third switching system 13' via the second switching system 12'. In this event, it is necessary in the second switching system 12' to carry out relay connection of a speech channel for the first switching system 11' and another speech channel for the third switching system 13' by a synchronous transfer mode (STM) link 12a. In addition, the first ATM multiplexing unit 21' is connected to the second ATM multiplexing unit 22' via a first ATM link 30-1 in the ATM network 30 while the second ATM multiplexing unit 22' is connected to the third ATM multiplexing unit 23 via a second ATM link 30-2 in the ATM network 30.

In a such case where the relay connection is made, the STM link 12a intervenes between the first and the second ATM links 30-1 and 30-2 and it results in connecting among the first ATM link 30-1, the STM link 12a, and the second ATM link 30-2. In the second ATM multiplexing unit 22', cell assembly and disassembly for ATM packets each having a fixed length is carried out for both of the speech channel of the first switching system 11' and the other speech channel of the third switching system 13'.

As described above, in the conventional ATM relay system comprising a plurality of switching systems, the cell assembly and disassembly must be carried out for ATM/STM conversion whenever the relay connection is carried out via the plurality of switching systems. As a result, delay of the cell assembly occurs. The delay of the cell assembly has adverse effect in speech communication owing to generation of echoes or the like.

In addition, in the above-mentioned conventional ATM relay system there is a case where a high efficient encoding such speech compression, silent compression or the like is carried out. When multistage ATM/STM conversions are carried out for the relay connection with such a high efficient encoding carried out, degradation of speech quality becomes violent in the speech communication. For example, a trouble of no communication arises in facsimile communication or the like.

Figure 2:
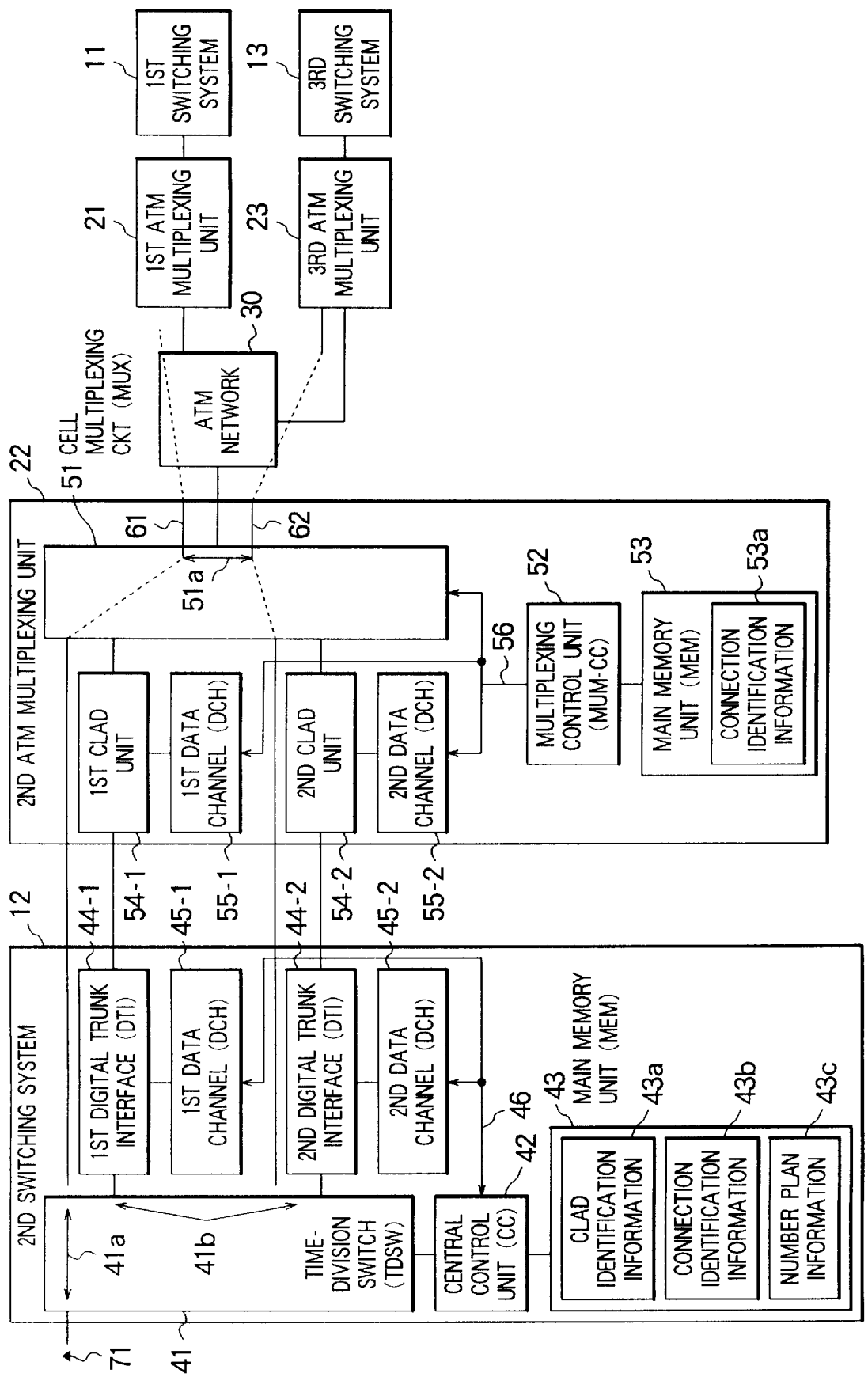
FIG. 2 is a block diagram of an ATM relay system according to a first embodiment of this invention.

Turning to FIG. 2, description will proceed to an ATM relay system according to a first embodiment of this invention. The illustrated ATM relay system comprises first through third switching systems 11, 12, and 13, first through third ATM multiplexing units 21, 22, and 23, and the ATM network 30. The first through the third switching systems 11 to 13 are connected to the ATM network 30 via the first through the third ATM multiplexing units 21 to 23, respectively.

A combination of the first switching system 11 and the first ATM multiplexing unit 21 is called a first private branch exchange system. A combination of the second switching system 12 and the second ATM multiplexing unit 22 is called a second private branch exchange system. A combination of the third switching system 13 and the third ATM multiplexing unit 23 is called a third private branch exchange system.

Inasmuch as the first through the third switching systems 11 to 13 have similar structure, structure of only the second switching system 12 is illustrated. In addition, inasmuch as the first through the third ATM multiplexing units 21 to 23 have similar structure, structure of only the second ATM multiplexing unit 22 is illustrated.

The second switching system 12 comprises a time-division switch (TDSW) 41, a central control unit (CC) 42, a main memory unit (MEM) 43, first and second digital trunk interfaces (DTI) 44-1 and 44-2, and first and second data channel units (DCH) 45-1 and 45-2.

The time-division switch 41 carries out time-division switching operation on an input STM signal to produce an output STM signal. The central control unit 42 is connected to the time-division switch 41 and the main memory unit 43. The central control unit 42 is connected to the first and the second data channel units 45-1 and 45-2 via an internal bus 56. In the manner which will later be described, the central control unit 42 delivers an interchange indication signal to the second ATM multiplexing unit 22, when the central control unit 42 detects that relay connection from the ATM network 30 to the ATM network 30 is carried out.

The main memory unit 43 stores information for use in call control in the second switching system 12 such as cell assembly and disassembly (CLAD) identification information 43a, connection identification information 43b, number plan information 43c, and so on.

The second ATM multiplexing unit 22 comprises a cell multiplexing circuit (MUX) 51, a multiplexing control unit (MUX-CC) 52, a main memory unit (MEM) 53, first and second CLAD units (CLAD) 54-1 and 54-2, and first and second data channel units (DCH) 55-1 and 55-2.

The first CLAD unit 54-1 is connected to the time-division switch 41 via the first digital trunk interface 44-1 while the second CLAD unit 54-1 is connected to the time-division switch 41 via the second digital trunk interface 44-2. Each of the first and the second CLAD unit 54-1 assembles the output STM signal into a plurality of output ATM packets each having a fixed length. In addition, each of the first and the second CLAD unit 54-1 disassembles a plurality of input ATM packets into the input STM signal.

The cell multiplexing circuit 51 is connected to the first and the second CLAD units 54-1 and 54-2 and the ATM network 30. The cell multiplexing circuit 51 multiplexes the output ATM packets into an output multiplexed ATM signal. In addition, the cell multiplexing circuit 51 demultiplexes an input multiplexed ATM signal from the ATM network 30 into the input ATM packets. In the manner which will later be described, the cell multiplexing circuit 51 interchanges, in response to the interchange indication signal, the input multiplexed ATM signal into the output ATM multiplexed signal.

The output STM signal is assembled into the plurality of output ATM packets so as to always have a constant bit rate every channel by the first CLAD unit 54-1. On assembling the cell, a connection identifier (CPI/VCI) is given to header information in the output ATM packet. The connection identifier is fixedly assigned with the channel in the time-division switch 41. A first connection identifier for the first CLAD unit 54-1 is read from the connection identification information 53a stored in the main memory unit 53 by the multiplexing control unit 52 on initialization of the second switching system 12 and is delivered to the first CLAD unit 54-1. In addition, a connection identifier for the first data channel 45-1 is given as a fixed connection identifier in the first CLAD unit 54-1. The second CLAD unit 54-2 is similar in structure and operation to the first CLAD unit 54-1. The output ATM packets from the first CLAD unit 54-1 are statistically multiplexed with other output ATM packets from other CLAD units by the cell multiplexing circuit 51 and it is possible to connect the ATM network 30.

In the ATM network 30, exchange of ATM cells is carried out on the basis of the header information of the ATM cells. In the example being illustrated, the first connection identifier assigned to the first CLAD unit 54-1 is for use in the first switching system 11 and therefore a first virtual channel 61 exists between the second ATM multiplexing unit 22 and the first ATM multiplexing unit 21. In addition, a second connection identifier assigned to the second CLAD unit 54-2 is for use in the third switching system 13 and therefore a second virtual channel 62 exists between the second ATM multiplexing unit 22 and the third ATM multiplexing unit 23.

Figure 3:
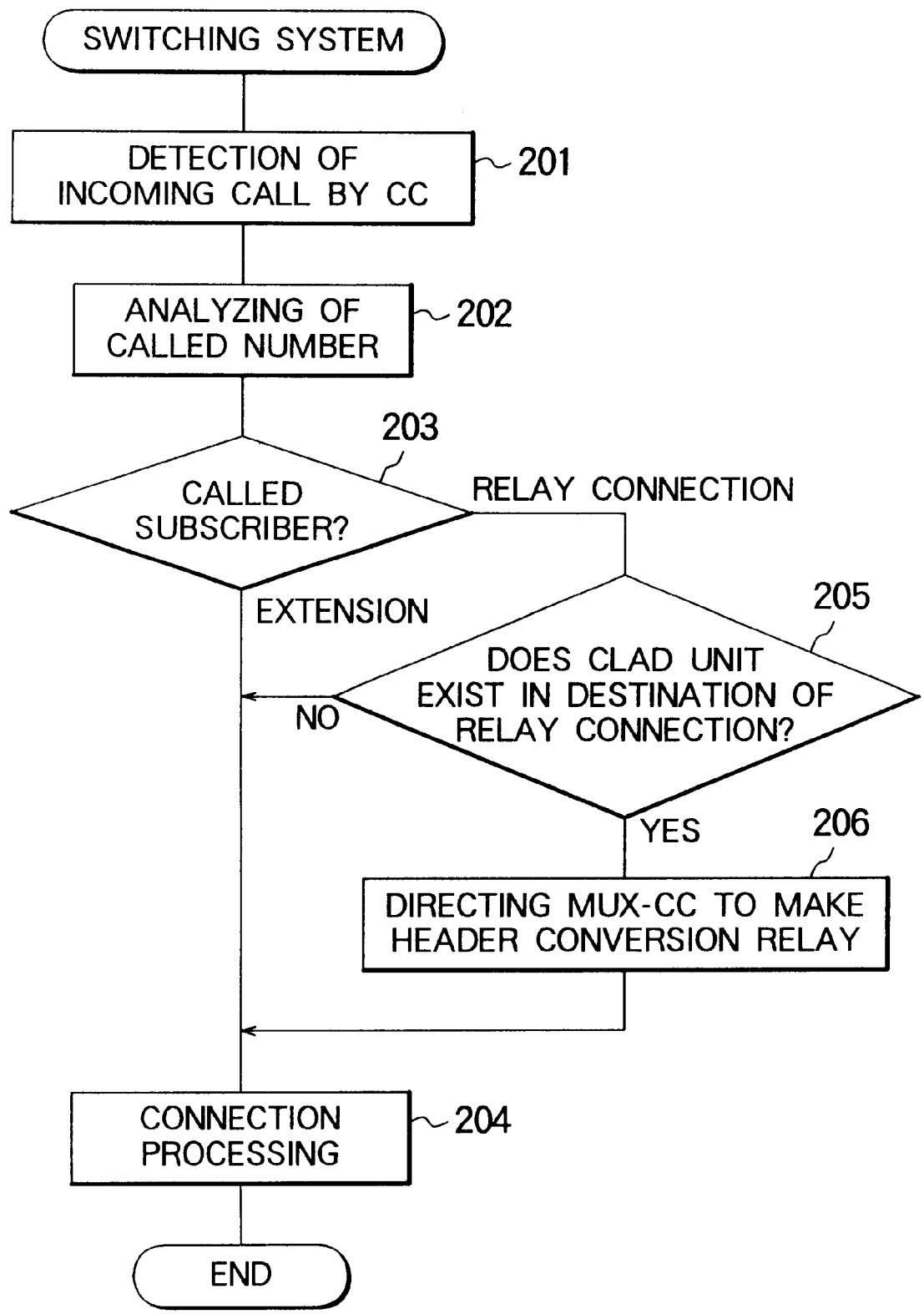
FIG. 3 shows a flow chart for use in describing operation of a switching system used in the ATM relay system illustrated in FIG. 2.
Figure 4:
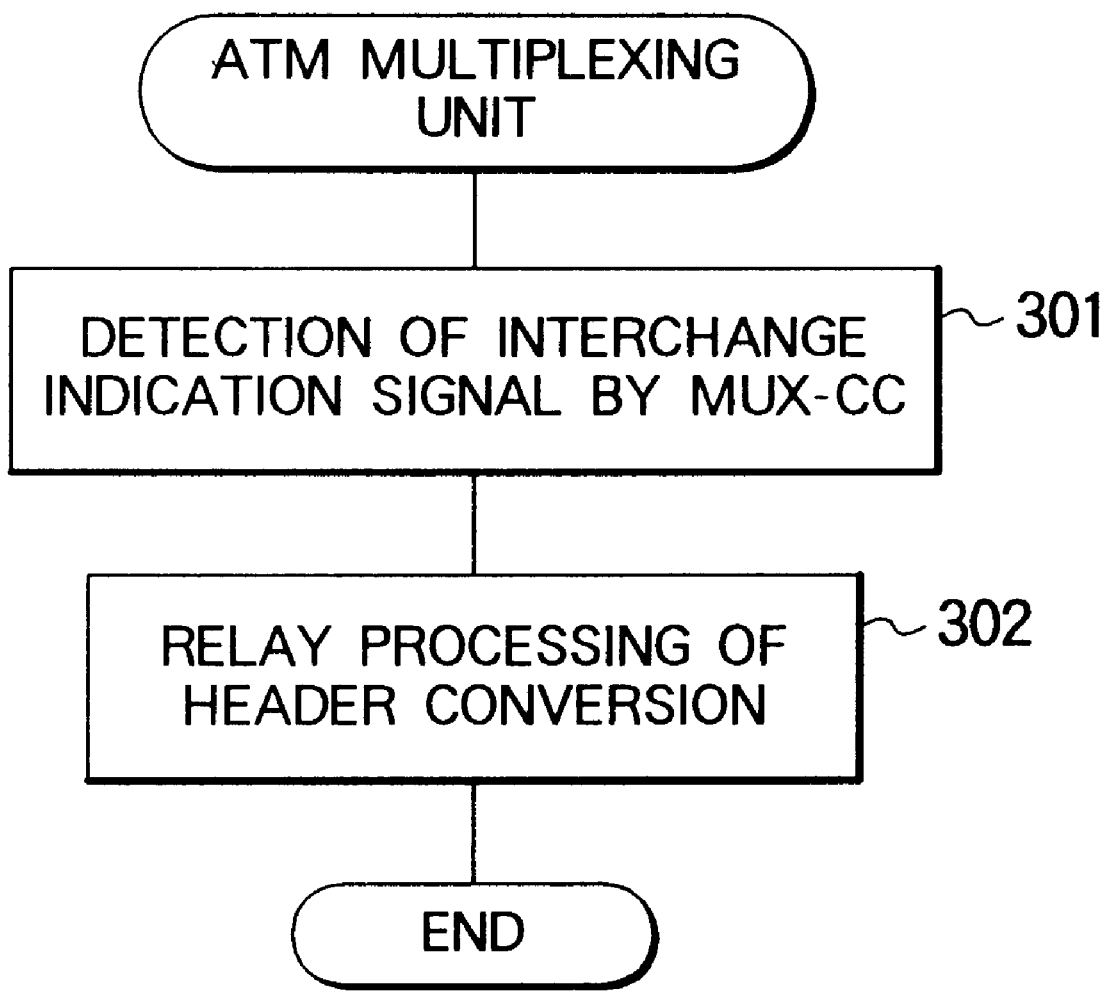
FIG. 4 shows a flow chart for use in describing operation of an ATM multiplexing unit used in the ATM relay system illustrated in FIG. 2.

Turning to FIGS. 3 and 4, description will be made as regards operation of the ATM relay system illustrated in FIG. 2. FIG. 3 is a flow chart for use in describing operation of the second switching system 12. FIG. 4 is a flow chart for use in describing operation of the second ATM multiplexing unit 22.

Referring to FIG. 3 in addition to FIG. 2, description will proceed to operation of the second switching system 12. It will assumed that a calling is made by an extension telephone set 71 accommodated in the second switching system 12. In this event, the central control unit 42 in the second switching system 12 receives incoming information from the first data channel unit 45-1 to detect an incoming call at a step 201. The step 201 is succeeded by a step 202 at which the central control unit 42 analyzes a called number included in the received incoming information. The step 202 proceeds to a step 203 at which the central control unit 42 determines a called subscriber by referring to the number plan information 43c stored in the main memory unit 43.

When the central control unit 42 determines that the called subscriber is the extension telephone set 71 on the basis of the called number included in the received incoming information at the step 203, the step 203 is followed by a step 204 at which a connection processing is carried out by the time-division switch 41 in the similar manner in a normal operation to establish an extension connection 41a as a channel in the time-division switch 41. Inasmuch as the cell multiplexing circuit 51 always carries out multiplexing/demultiplexing on the ATM cells at CRB base and as the first CLAD unit 54-1 always carries out cell assembly/cell disassembly on the ATM cells at the CBR base, it is possible to carry out an actual speech by establishing the extension connection 41a in the time-division switch 41 as the channel by the central control unit 42.

When the central control unit 42 determines that the called subscriber is a subscriber wherein a relay connection is required at the step 203, the step 203 is succeeded by a step 205 at which the central control unit 46 determines whether or not any CLAD unit exists in a destination of the relay connection by referring to the CLAD identification information 43a stored in the main memory unit 43. This determination is carried out as follows. Information indicating whether or not the CLAD unit exists in the destination of the relay connection is preliminarily stored in the main memory unit 43 as the CLAD identification information 43a corresponding to routes of the relay connection. The central control unit 42 determines whether or not the CLAD unit exists in the destination of the relay connection on the basis of the CLAD identification information 43a read out of the main memory unit 43.

When the central control unit 42 determines that the CLAD unit does not exist in the destination of the relay connection at the step 205, the step 205 proceeds to the step 204 at which the central control unit 42 carries out a normal connection processing in the similar manner on extension incoming call.

It is presumed that the destination of the relay connection is a circuit for the third switching system 13. In this event, the relay connection is carried out for the third switching system 13 with the ATM cells as it is. This is because the second CLAD unit 54-2 exist in the destination of the relay connection. When the central control unit 42 recognizes that the relay connection is made between the first and the second CLAD units 54-1 and 54-2, the central control unit 42 delivers the interchange indication signal to the second ATM multiplexing unit 22 via the second data channel unit 45-2 and the second digital trunk interface 44-2 in order to change the channel from a TDSW relay connection 41b to an ATM cell relay connection 51a. That is, the central control unit 42 reads connection identifiers for the first and the second CLAD units 54-1 and 54-2 from the main memory unit 43 and sends the interchange indication signal to the second multiplexing unit 22 with those connection identifiers included in the interchange indication signal as information indicative of header conversion at a step 206.

Referring to FIG. 4 in addition to FIG. 2, description will proceed to operation of the second ATM multiplexing unit 22. When the multiplexing control unit 52 in the second ATM multiplexing unit 22 detects the interchange indication signal supplied from the central control unit 42 at a step 301, the multiplexing control unit 22 recognizes the connection identifiers of the first and the second virtual channels 61 and 62 for the first and the second CLAD units 54-1 and 54-2 that are included in the detected interchange indication signal and instructs the cell multiplexing circuit 51 to interchange between the first and the second virtual channels 61 and 62.

The cell multiplexing circuit 51 carries out relay processing of the header conversion at a step 302. More specifically, the cell multiplexing circuit 51 interchanges the ATM cells received from the first switching system 11 with the header information of the ATM cells on the first virtual channel 61 converted to the connection identifier for the second virtual channel 62. In addition, the cell multiplexing circuit 51 interchanges the ATM cells received from the third switching system 13 with the header information of the ATM cells on the second virtual channel 62 converted to the connection identifier for the first virtual channel 61. As a result, actual channel information is interchanged via the ATM cell relay connection 51a in the cell multiplexing circuit 51 although the channel is established at the TDSW relay connection 41b in the time-division switch 41.

Figure 5:
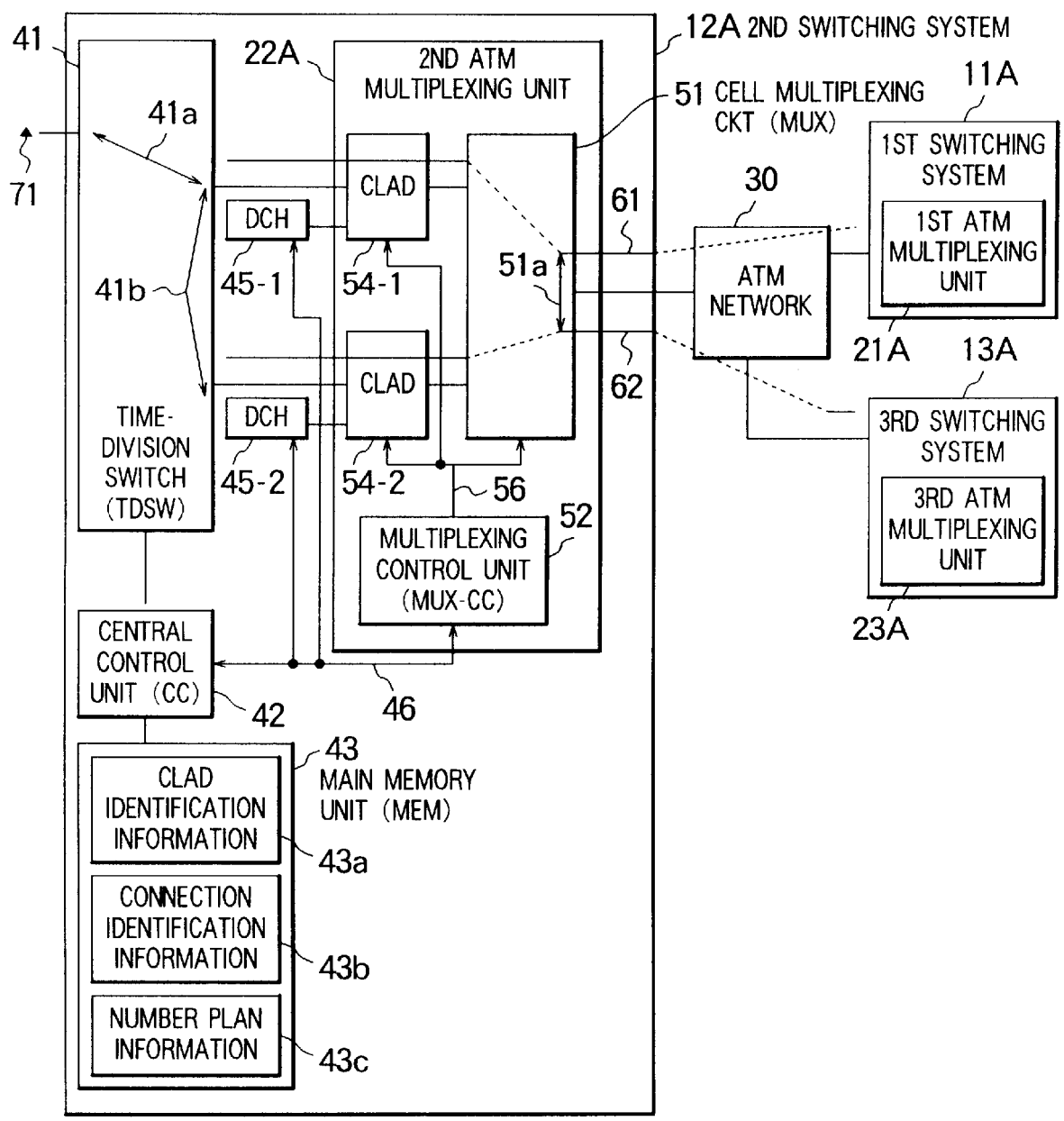
FIG. 5 is a block diagram of an ATM relay system according to a second embodiment of this invention.

Turning to FIG. 5, description will proceed to an ATM relay system according to a second embodiment of this invention. The illustrated ATM relay system comprises first through third switching systems 11A, 12A, and 13A and the ATM network 30. The first through the third switching systems 11A to 13A are directly connected to the ATM network 30. The first through the third switching systems 11A to 13A contain first through third ATM multiplexing units 21A, 22A, and 23A, respectively.

Inasmuch as the first through the third switching systems 11A to 13A have similar structure, structure of only the second switching system 12A is illustrated. In addition, inasmuch as the first through the third ATM multiplexing units 21A to 23A have similar structure, structure of only the second ATM multiplexing unit 22A is illustrated.

The second switching system 12A comprises the time-division switch 41, the central control unit 42, the main memory unit 43, and the first and the second data channel units 45-1 and 45-1 as well as the second ATM multiplexing unit 22A.

The second ATM multiplexing unit 22A comprises the cell multiplexing unit 51, the multiplexing control unit 52, and the first and the second CLAD units 54-1 and 54-2. The first and the second CLAD units 54-1 and 54-2 are directly connected to the time-division switch 41. The multiplexing control unit 51 is connected to the central control unit 42 via the internal bus 46.

Inasmuch as operation of the ATM relay system illustrated in FIG. 5 is similar to that of the ATM relay system illustrated in FIG. 2, description of the operation of the ATM relay system illustrated in FIG. 5 is omitted.

While this invention has thus far been described in conjunction with a few preferred embodiments threrof, it will now be readily possible for those skilled in the art to put this invention into various other manners. For example, although description is made as regards the relay connection of the ATM cells for the CBR base in the above embodiments, the relay connection of the ATM cells may be applied to other ATM communication systems which include variable bit rate (VBR) base or the like. In addition, CODECs for speech compression may be arranged between the first and the second CLDA units 54-1 and 54-2 and the time-division switch 41. In this event, the relay connection is carried out the ATM cells as it is without multistage compression/extension.

What is claimed is:

1. A private branch exchange system comprising a switching system and an asynchronous transfer mode (ATM) multiplexing unit connected to an ATM network, said switching system including a time-division switch, said ATM multiplexing unit being connected to said switching system via a truck interface, wherein said switching system comprising means for delivering an interchange indication signal to said ATM multiplexing unit on carrying out a relay connection from the ATM network to the ATM network, thereby making said ATM multiplexing unit carry out an interchange operation in response to the interchange indication signal.

2. A private branch exchange system as claimed in claim 1, wherein said time-division switch carries out time-division switching operation on an input synchronous transfer mode (STM) signal to produce an output STM signal, said ATM multiplexing unit comprising:

cell assembly and disassembly means, connected to said time-division switch via the truck interface, for assembling the output STM signal into a plurality of output ATM packets each having a fixed length and for disassembling a plurality of input ATM packets into the input STM signal;

multiplexing/demultiplexing means, connected to said cell assembly and disassembly means and said ATM network, for multiplexing the output ATM packets into an output multiplexed ATM signal and for demultiplexing an input multiplexed ATM signal from said ATM network into the input ATM packets; and means, responsive to the interchange indication signal, for making said multiplexing/demultiplexing means interchange the input multiplexed ATM signal into the output ATM multiplexed signal.

3. A switching system comprising a time-division switch and an asynchronous transfer mode (ATM) multiplexing unit connected to an ATM network, said ATM multiplexing unit being connected to said time-division switch, wherein said switching system comprising means for delivering an interchange indication signal to said ATM multiplexing unit on carrying out a relay connection from the ATM network to the ATM network, thereby making said ATM multiplexing unit carry out an interchange operation in response to the interchange indication signal.

4. A switching system as claimed in claim 3, wherein said time-division switch carries out time-division switching operation on an input synchronous transfer mode (STM) signal to produce an output STM signal, said ATM multiplexing unit comprising:

cell assembly and disassembly means, connected to said time-division switch, for assembling the output STM signal into a plurality of output ATM packets each having a fixed length and for disassembling a plurality of input ATM packets into the input STM signal;

multiplexing/demultiplexing means, connected to said cell assembly and disassembly means and said ATM network, for multiplexing the output ATM packets into an output multiplexed ATM signal and for demultiplexing an input multiplexed ATM signal from said ATM network into the input ATM packets; and means, responsive to the interchange indication signal, for making said multiplexing/demultiplexing means interchange the input multiplexed ATM signal into the output ATM multiplexed signal.

5. An asynchronous transfer mode (ATM) relay system comprising an ATM network and a plurality of private branch exchange systems each of which comprises a switching system and an ATM multiplexing unit connected to said ATM network, said switching system including a time-division switch, said ATM multiplexing unit being connected to said switching system via a truck interface, wherein said switching system comprising means for delivering an interchange indication signal to said ATM multiplexing unit on carrying out a relay connection from the ATM network to the ATM network, thereby making said ATM multiplexing unit carry out an interchange operation in response to the interchange indication signal.

6. An ATM relay system as claimed in claim 5, wherein said time-division switch carries out time-division switching operation on an input synchronous transfer mode (STM) signal to produce an output STM signal, said ATM multiplexing unit comprising:

cell assembly and disassembly means, connected to said time-division switch via the truck interface, for assembling the output STM signal into a plurality of output ATM packets each having a fixed length and for disassembling a plurality of input ATM packets into the input STM signal;

multiplexing/demultiplexing means, connected to said cell assembly and disassembly means and said ATM network, for multiplexing the output ATM packets into an output multiplexed ATM signal and for demultiplexing an input multiplexed ATM signal from said ATM network into the input ATM packets; and means, responsive to the interchange indication signal, for making said multiplexing/demultiplexing means interchange the input multiplexed ATM signal into the output ATM multiplexed signal.

7. An asynchronous transfer mode (ATM) relay system comprising an ATM network and a plurality of switching systems each of which comprises a time-division switch and an ATM multiplexing unit connected to said ATM network, said ATM multiplexing unit being connected to said time-division switch, wherein said switching system comprising means for delivering an interchange indication signal to said ATM multiplexing unit on carrying out a relay connection from the ATM network to the ATM network, thereby making said ATM multiplexing unit carry out an interchange operation in response to the interchange indication signal.

8. An ATM relay system as claimed in claim 7, wherein said time-division switch carries out time-division switching operation on an input synchronous transfer mode (STM) signal to produce an output STM signal, said ATM multiplexing unit comprising:

cell assembly and disassembly means, connected to said time-division switch, for assembling the output STM signal into a plurality of output ATM packets each having a fixed length and for disassembling a plurality of input ATM packets into the input STM signal;

multiplexing/demultiplexing means, connected to said cell assembly and disassembly means and said ATM network, for multiplexing the output ATM packets into an output multiplexed ATM signal and for demultiplexing an input multiplexed ATM signal from said ATM network into the input ATM packets; and means, responsive to the interchange indication signal, for making said multiplexing/demultiplexing means interchange the input multiplexed ATM signal into the output ATM multiplexed signal.

* * * * *